United States Patent [19]

Gauch et al.

[11] E Re. 30,907

[45] Reissued Apr. 20, 1982

[54] COOLING DEVICE FOR SEWING MACHINES

[75] Inventors: Hermann Gauch, Moglingen; Dieter Schopf, Gerlingen, both of Fed. Rep. of Germany

[73] Assignee: Union Special G.m.b.H., Stuttgart, Fed. Rep. of Germany

[21] Appl. No.: 94,517

[22] Filed: Nov. 15, 1979

Related U.S. Patent Documents

Reissue of:

[64] Patent No.: 4,062,310
Issued: Dec. 13, 1977
Appl. No.: 709,476
Filed: Jul. 28, 1976

[30] Foreign Application Priority Data

Aug. 2, 1975 [DE] Fed. Rep. of Germany ..... 2534568
Jun. 6, 1976 [DE] Fed. Rep. of Germany ..... 2627015

[51] Int. Cl.[3] ..... D05B 71/00
[52] U.S. Cl. ..... 112/280; 112/259
[58] Field of Search ..... 112/280, 258, 259, 270, 112/281; 416/60; 415/219 B

[56] References Cited

U.S. PATENT DOCUMENTS

| | | | |
|---|---|---|---|
| 1,385,904 | 7/1921 | Cohen | 112/279 X |
| 1,417,470 | 5/1922 | Della et al. | 112/280 X |
| 2,144,326 | 1/1939 | Callaghan | 112/280 |
| 2,423,996 | 7/1947 | Rubel | 112/281 |
| 2,446,261 | 8/1948 | Christensen et al. | 112/281 |
| 2,678,013 | 5/1954 | Wallenberg et al. | 112/280 |
| 2,711,146 | 6/1955 | Peterson et al. | 112/280 |
| 2,721,692 | 10/1955 | Happe | 112/280 X |
| 3,441,201 | 4/1969 | Hollenberg | 112/280 X |
| 3,638,594 | 2/1972 | Armstead et al. | 112/280 |
| 3,771,478 | 11/1973 | Tranquilla et al. | 112/280 |
| 3,779,188 | 12/1973 | Marforio | 112/280 |

*Primary Examiner*—H. Hampton Hunter
*Attorney, Agent, or Firm*—John W. Harbst; John A. Schaerli

[57] ABSTRACT

A sewing machine provided with a fan which is formed as an integral part of the handwheel and drive pulley and serves the purpose of drawing air there through for cooling. A shroud and a baffle cooperate to direct the air drawn in by the fan downward and over the bottom cover of the sewing machine which is provided with heat dissipating fins.

8 Claims, 6 Drawing Figures

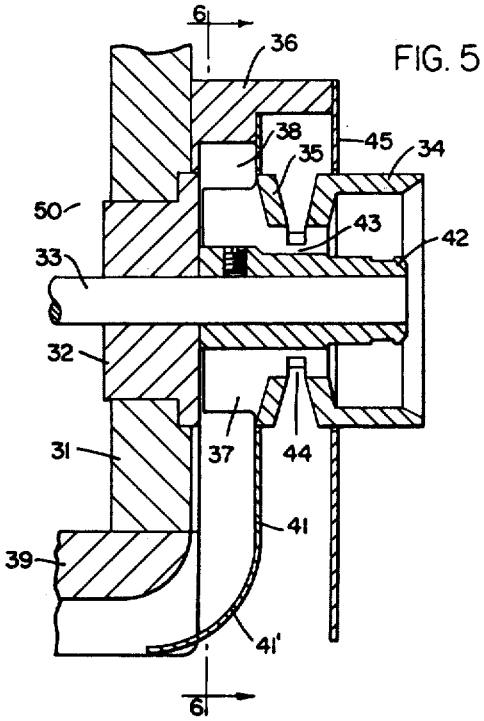
FIG. 5
FIG. 6
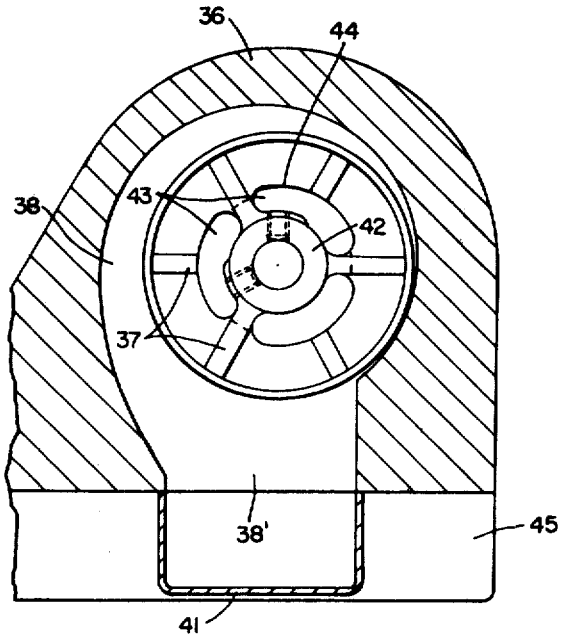

COOLING DEVICE FOR SEWING MACHINES

Matter enclosed in heavy brackets [ ] appears in the original patent but forms no part of this reissue specification; matter printed in italics indicates the additions made by reissue.

The present invention relates to Sewing Machines and in particular to a cooling device for a sewing machine.

BACKGROUND OF THE INVENTION

Many of todays industrial sewing machines are operated at exceptionally high speeds, up to 8000 rpm. These machines contain complicated mechanisms having many parts that are in moving contact. Running at these high speeds a large amount of frictional heat is generated resulting in heating up the oil, the parts and the machine housing. If the temperatures are not limited, the lubricant will break down and not lubricate properly. Further if the housing temperature gets too high it can cause discomfort to the operator. Cooling devices are used to reduce these high temperatures.

DESCRIPTION OF THE PRIOR ART

Cooling devices on sewing machines containing fan blades mounted on the main shaft are generally known in the art as shown in U.S. Pat. No. 3,779,188 patented Dec. 18, 1973 by Nerimo Marforio. U.S. Pat. No. 3,779,188 discloses fan blades accommodated in a housing compartment at the handwheel end and circulate cooling air over the top cover and bottom finned cover of the machine to remove the heat. These cooling devices which were hitherto known are extremely expensive since they require specially constructed machine housings. Further as shown in U.S. Pat. No. 3,779,188 the air supplied to the cooling fins of the bottom cover has been drawn over the top cover, a hot region, and therefore is heated up to the extent that it can scarcely absorb any more heat from cooling fins.

SUMMARY OF THE INVENTION

The invention hereunder consideration is a cooling device which includes a fan which is formed as an integral part of the sewing machine driven pulley. A handwheel, normally associated with the machine, is constructed in the form of an air inlet, and surrounds the fan blades. The fan, handwheel and pulley associate together with a shroud to form an air chamber which has a path open to the bottom cover plate. The present invention consists essentially of parts which are in any case necessary for the operation of the machine. A coaxial opening in the handwheel serves as an air inlet. This permits the drawing in of air at room temperature so that a relatively great temperature gradient between the cooling fins and the cooling air exists and hence a satisfactory heat dissipation is achieved. Further details show that baffles are provided which project into the opening, facing towards the bottom cover and supply the stream of air to the cooling fins of the bottom cover and that the passages formed by the cooling fins extend parallel to the main shaft and turn in the direction of sewing below the stitch forming area. The baffles guiding the stream of air make an important contribution to a satisfactory cooling because they positively convey the stream of cooling air onto the cooling fins. The deflection of the cooling fins out of parallel to the main shaft into the sewing direction guides the intensive stream of air away from the operator of the machine so as to avoid being a nuisance. With the present invention no special adaptation of the machine housing is necessary.

Another form of embodiment is disclosed in the present invention wherein the air inlets extend through the handwheel and drive pulley and lead into a chamber formed in front of the drive pulley at the housing side, into which the fan blades rotating with the drive pulley extend. The chamber forms a spiral which widens out radially in relation to the fan blades and has its largest opening cross-section directed towards the base plate of the sewing machine.

It is therefore an object of this invention to provide a cooling device for a sewing machine.

Another object of the invention is to provide an inexpensive cooling device for a sewing machine.

Another object of the invention is to provide a cooling device for a sewing machine that is easy to install.

Another object of the invention is to provide a cooling device employing a shroud to direct air, from a fan, over the bottom of a sewing machine.

BRIEF DESCRIPTION OF DRAWINGS

The invention will be further understood from the following description and accompanying drawings in which;

FIG. 5 is a front sectional view through the handwheel region of a sewing machine showing another embodiment of the invention;

FIG. 6 is an end view in partial section taken along section line 6—6 of FIG. 5;

Figure 1:
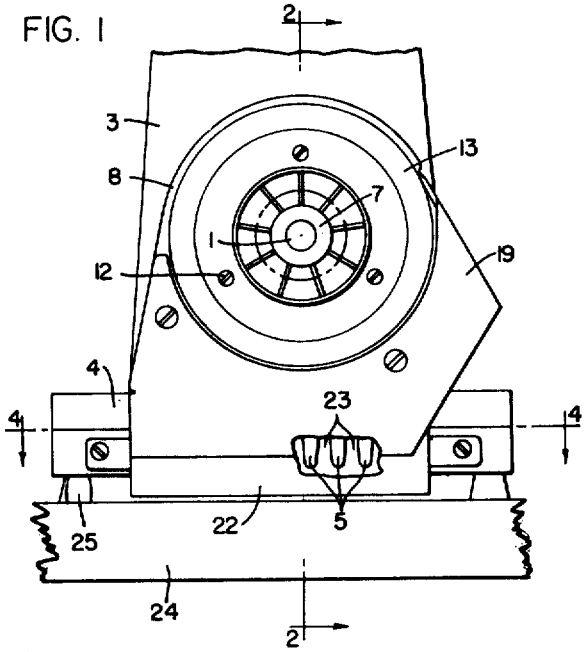
FIG. 1 is a partial side view of a sewing machine at the handwheel side.
Figure 3:
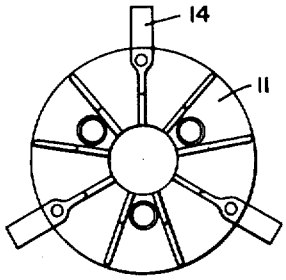
FIG. 3 is a front view of the fan.
Figure 2:
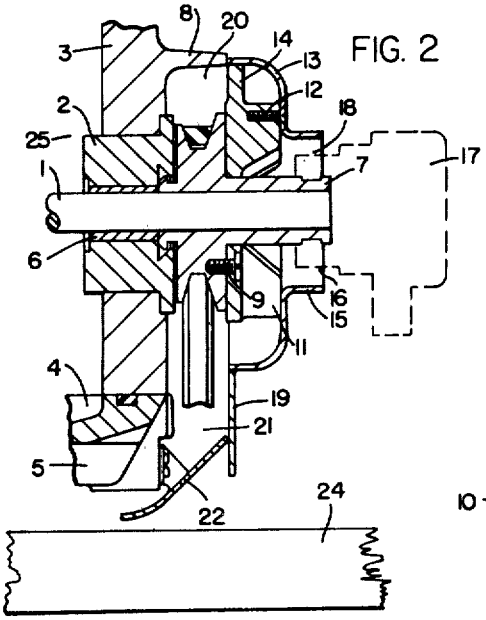
FIG. 2 is a partial front view in section, taken along the section line 2—2 of FIG. 1.

In one practical development of the invention as shown in FIGS. 1 through 4 the sewing machine main drive shaft means 1 is appropriately journaled for rotation in bushing 6. Bushing 6 is carried by housing 2, fixedly secured in machine frame 3. The main drive shaft 1 extends through the machine chamber 25 and extends beyond the machine frame 3 at the right side thereof where it is adapted for external drive, i.e., the main drive shaft 1 is provided with a drive pulley 7 which is partially encompassed by a flange 8 on machine frame 3.

Figure 4:
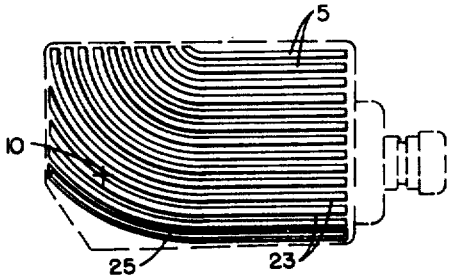
FIG. 4 is a top plan view taken along section line 4—4 of FIG. 1.

Mounted onto the drive pulley 7 by screw means 9 is a centrifugal fan means 11, onto which handwheel 13 is in turn mounted to by screw means 12. The handwheel 13 is supported on projecting arms 14 of the fan blade means 11. A flange 15, which is coaxial with the main shaft, is formed on the handwheel 13. The flange 15 surrounds with spacing the hub 16 of a sychronizer 17 mounted on the end of the main drive shaft 1. The flange 15 forms a coaxial intake port 18 with the hub 16 for the fan means 11. The sewing machine frame 3 is covered by a bottom cover plate 4 which contains a plurality of cooling fins 5. The cooling fins 5 extend parallel to the main drive shaft 1 at their first portion means over most of the bottom cover plate 4 and they turn at their second portion means in the sewing direction below the stitch forming area 10 (FIG. 4).

The handwheel 13, together with the flange 8 of the machine frame 3 and a belt guard or shroud means 19, form a chamber 20 into which the air is forced and from which it emerges through an aperture 21. Projecting into the aperture 21 is a baffle 22 which is secured in any conventional manner to the bottom cover 4 and which guides the air emerging from the chamber 20 through the aperture 21 into the passages 23 (FIG. 4) formed between the cooling fins 5. As viewed in FIG. 4, in order to prevent the air from escaping in the direction of the operator, a sealing strip 25 is disposed between the bottom cover plate 4 and the tableboard 24 at the operator's side. The sealing strip 25 substantially follows the course of the cooling fins in order to direct the cooling air away from the operator.

Upon rotation of drive pulley 7, fan 11 draws air in through inlet port 18 and discharges the air radially toward handwheel 13 that in turn directs it into chamber 20. Flowing downward from chamber 20, the air is diverted by baffle 22 to flow horizontally in the passages 23 between the cooling fins 5 whereby cooling the machine frame 3 and the oil held on the bottom cover plate 4.

Referring to FIGS. 5 and 6 wherein is shown a second embodiment of the invention, a drive pulley 35 formed with a handwheel 34 as an integral part thereof is mounted on the main shaft 33. The main shaft extends thru the machine chamber 50 and extends thru the bearing 32 secured in the housing 31. The drive pulley 35 is surrounded by a belt guard 36 which is secured to the housing 31.

Adjacent to the drive pulley 35, on the housing side, are fan blades 37 which extend into an air chamber means 38 formed by the belt guard 36. As best viewed in FIG. 6 the air chamber means 38 widens out in the form of a spiral, radially in relation to the fan blades and has its largest opening 38' at the underside in the region of the bottom cover 39 of the housing 31. The air chamber means 38 is bounded in the axial direction of the main shaft 33, on the one side by the housing and on the other side by a shroud means 41 which has a baffle means 41' at the under side to guide cooling air over the bottom cover 39.

Air inlets 43 in the hub 42 of the drive pulley 35, extend from the handwheel 34 to the chamber 38. These openings 43 meet with apertures 44 in the bottom of the belt raceway thereby forming additional air intakes. The belt guard 36 carries a cover 45 which forms a protection against accidental intervention of the operator's hand in the belt groove.

With this cooling device, on rotation of the drive pulley 35, fan blades 37 draw air into the chamber 38 through the handwheel 34 and the apertures 44 via the air inlets 43 in the hub 42 and from there the air is directed over the bottom cover 39 whereby cooling the machine housing and oil situated therein.

Thus it is apparent that there has been provided, in accordance with the present invention, a Cooling Device for Sewing Machines that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A cooling device for sewing machines having stitch forming instrumentalities defining a stitch forming area and a frame having a machine chamber means, said cooling device comprising:

a main drive shaft means mounted in said frame longitudinally thereof;

a drive pulley means mounted on said drive shaft means, including fan means formed as an integral part thereof;

handwheel means [surrounding said fan means and] fixedly secured [thereto] *to said fan means*, said handwheel means having [an] *a tubular* inlet [port] *passage opening to said fan means and centrally arranged so that air drawn through said inlet passage by said fan means is directed toward and propelled radially outwardly from the central area of said fan means;* shroud means secured to said frame [,] and associating with said frame and said handwheel means whereby forming an air chamber means; and means for directing air discharged from said air chamber means along the bottom of said machine.

2. A cooling device as in claim 1, wherein said fan means is a centrifugal type fan.

3. A cooling device as in claim 1, wherein said inlet port is a coaxial opening in said handwheel means.

4. A cooling device as in claim 1, wherein said means for directing air discharged from said air chamber means along the bottom of the machine is a baffle means secured to said machine frame.

5. A cooling device as in claim 1, further including a bottom cover means which is provided with a plurality of heat dissipating fins.

6. A cooling device as in claim 5 wherein said heat dissipating fins have a first portion means extending parallel to said drive shaft and a second portion means turning in the direction of sewing below the stitch forming area.

7. A cooling device for sewing machines having a frame including a machine chamber means, said cooling device comprising:

a drive shaft means mounted in bearing means on said frame longitudinally thereof;

a combined handwheel and drive pulley means carried by said drive shaft means and having [at least one] *centrally arranged air* inlet [port] means;

a belt guard means secured to said frame about said handwheel and drive pulley means and having shroud means secured thereto whereby forming an air chamber means;

a fan means formed as an integral part of said handwheel and drive pulley means, said fan means being disposed in said air chamber means; and said shroud means includes baffle means for directing air discharged from said air chamber means along the bottom of said machine.

8. A cooling device as in claim 7 wherein said air chamber means has the form of a spiral, radially in relation to said fan.

* * * * *